(12) United States Patent
Mamerow

(10) Patent No.: US 6,363,880 B1
(45) Date of Patent: Apr. 2, 2002

(54) DEVICE FOR COATING FOODSTUFF ARTICLES WITH COCOA BUTTER-CONTAINING SUBSTANCES OR SIMILAR FAT-CONTAINING SUBSTANCES

(75) Inventor: Bernd Mamerow, Hamburg (DE)

(73) Assignee: Hosokawa Kreuter GmbH, Hamburg (DE)

( * ) Notice: Subject to any disclaimer, the term of this patent is extended or adjusted under 35 U.S.C. 154(b) by 0 days.

(21) Appl. No.: 09/564,149

(22) Filed: May 3, 2000

(30) Foreign Application Priority Data

May 4, 1999 (DE) .................. 299 07 948 U

(51) Int. Cl.[7] ............................. A23G 3/20
(52) U.S. Cl. .................... 118/22; 118/13
(58) Field of Search .............. 118/13, 22, 57, 118/19; 193/2 B; 209/920; 198/752.1, 759, 760, 621.3, 688.1, 773, 774.3, 804

(56) References Cited

U.S. PATENT DOCUMENTS 3,913,389 A * 10/1975 Larson ................ 73/71.6
4,979,463 A * 12/1990 Sollich ................ 118/21

FOREIGN PATENT DOCUMENTS

| DE | 3839440 | 4/1971 |
|----|---------|--------|
| DE | 3734626 | 11/1988 |
| DE | 4241610 | 6/1994 |

* cited by examiner

Primary Examiner—Richard Crispino
Assistant Examiner—Kevin P Shortsle
(74) Attorney, Agent, or Firm—Friedrich Kueffner

(57) ABSTRACT

A device for coating food articles with a fat-containing substance has a circulating endless mesh belt having an upper belt portion for transporting the foodstuff articles in a transport direction and a lower return belt portion. A shaking device is positioned underneath the upper belt portion downstream in the transport direction of an area where the foodstuff articles are coated. The shaking device has transverse stays positioned transversely to the transport direction. The transverse stays can be reciprocated vertically with a shaking amplitude against the upper belt portion. The transverse stays are supported individually and can be reciprocated individually in a reciprocating direction.

7 Claims, 3 Drawing Sheets

DEVICE FOR COATING FOODSTUFF ARTICLES WITH COCOA BUTTER-CONTAINING SUBSTANCES OR SIMILAR FAT-CONTAINING SUBSTANCES

BACKGROUND OF THE INVENTION

1. Field of the Invention

The invention relates to a device for coating foodstuff articles with cocoa butter-containing substances or similar fat-containing substances, having a mesh belt conveying the articles to be coated and a shaking device positioned underneath the upper belt portion of the mesh belt, wherein the shaking device comprises transverse stays that extend transversely to the transport direction and can be vertically reciprocated against the upper portion of the mesh belt.

2. Description of the Related Art

A device of this kind, which is also referred to as a chocolate coating device, is known from German patent 38 39 440. In this known device the transverse stays are connected to longitudinal rods so that all of the transverse stays are reciprocated together. The reciprocating movement of the transverse stays is realized in that the longitudinal rods to which they are connected are moved reciprocatingly. For this purpose, one end of the longitudinal rods is pivotably supported, while the other end is reciprocated by shaking wheels which are embodied as gear wheels. Accordingly, they carry out the upward movement as well as the braking action (impact).

The moved mass of this known device is very large and accordingly sluggish. An individual adjustment is not possible because the amplitude or the stroke is commonly adjustable for all transverse stays, and the stroke and revolutions per minute (rpm) are dependent on one another.

SUMMARY OF THE INVENTION

It is an object of the present invention to provide a device of the aforementioned kind in which the masses to be moved during shaking are reduced greatly and an improved and individual adjusting action is possible.

In accordance with the present invention, this is achieved in that the transverse stays are individually supported outside of the coating area and are reciprocated independently of one another.

An especially advantageous embodiment has eccentric discs provided for the reciprocating movement of each transverse stay, wherein each revolution of the eccentric disc performs a shaking amplitude and wherein the eccentric curve between the points of highest and lowest amplitude has a jump.

Since the transverse stays are individually supported, they can be reciprocated independently of one another for the purpose of shaking the mesh belt. The individual transverse stay has a minimal mass while providing identical strength in the stroke direction as well as in the mesh belt direction so that it can be easily accelerated and moved. The shaking amplitude and the stroke of the movement of each transverse stay can be adjusted individually.

Since the shaking movement, i.e., the upward movement, is performed by eccentric discs which, after reaching the highest point, undergo a free fall and since the braking action is realized by means of impact plates, it is ensured that for each revolution of the eccentric disc a complete shaking amplitude is performed. This is not ensured in the case of gear wheels in which the individual teeth follow one another very quickly, especially at high rpm.

The shaking stroke which is determined by the eccentric curve of the eccentric discs is advantageously transmitted by plunger arrangements onto the transverse stays. This makes it possible to arrange the eccentric discs underneath the lower return belt portion of the mesh belt.

When the device is embodied such that the plunger arrangements are telescopic and have a spring that is tensioned during the upward movement of the plunger arrangement and that is released upon downward movement of the plunger arrangement, an enhancement of the impact is realized. The spring of the telescopically embodied plunger arrangement is tensioned upon upward movement without impeding the function of the plunger arrangement. The downward movement releases the spring and the spring action enhances thus the free fall so that the impact of the shaking action is improved.

For the purpose of adjusting the amplitude, adjusting beams are provided extending perpendicularly to the transverse stays and being adjustable in the direction of the shaking stroke, wherein the transverse stays when moving downwardly impact on the adjusting beams.

Preferably, the adjusting beams have impact plates for the transverse stays.

The adjusting beams can be adjusted via adjusting plungers by eccentric adjusting discs.

DESCRIPTION OF THE PREFERRED EMBODIMENTS

Figure 1:
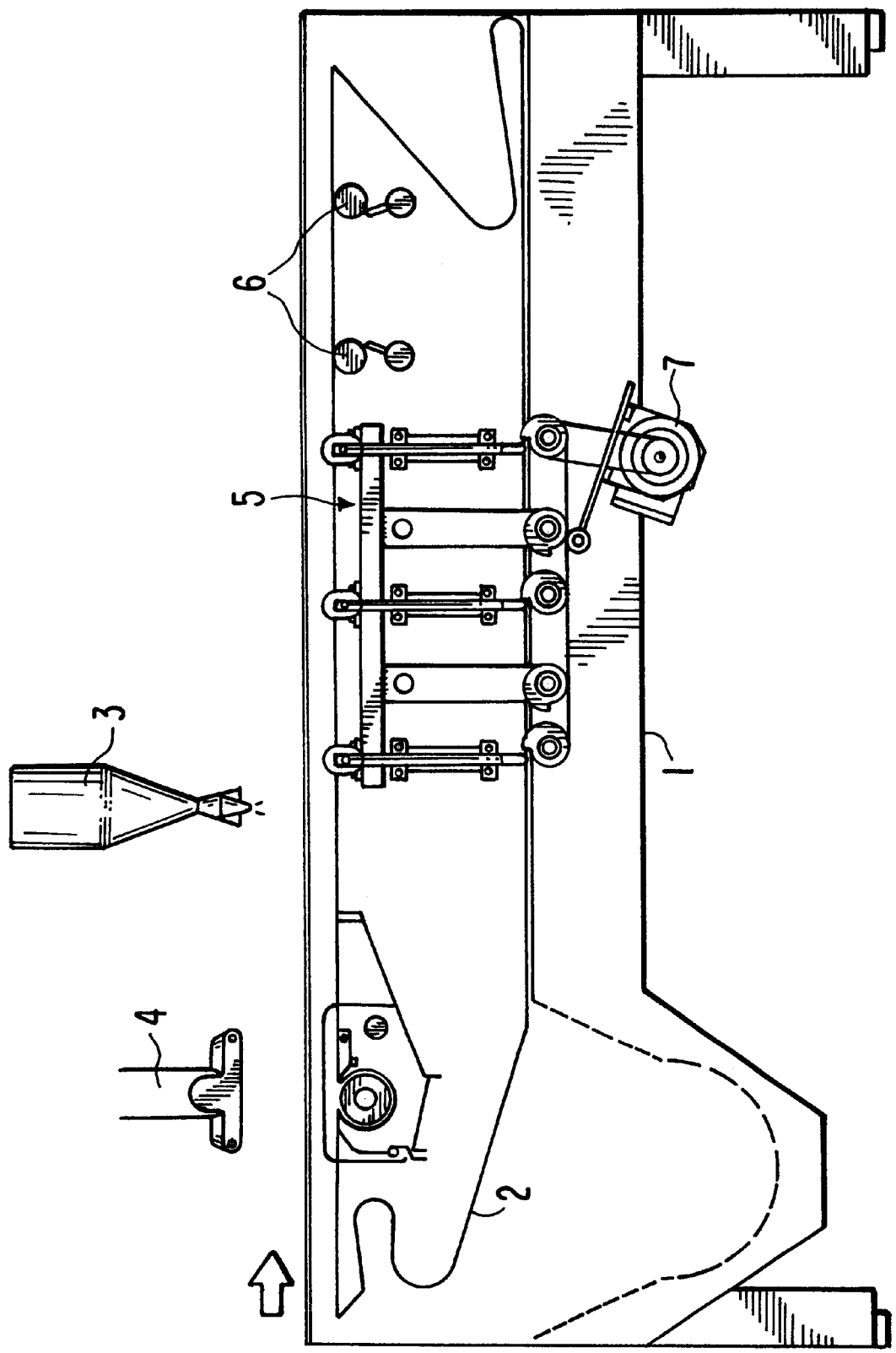
FIG. 1 is a side view of the essential parts of a chocolate coating device with shaking device according to the invention.

In FIG. 1 a chocolate coating device is represented in which the foodstuff articles to be coated, for example, cookies, are received on the left side. On the frame 1 an endless mesh belt 2 moves from the left feed area to the right outlet or removal area. Downstream of the feed area in the transport direction a coating station 4 is provided and downstream of the coating station 4 a blower 3 is arranged. Below the coating station 4 a bottom depression for applying excess chocolate to the underside of the cookies is provided.

Downstream of the bottom depression in the transport direction a shaking device 5 is provided which is driven by a motor 7. Bottom stripping rollers 6 are provided at the end of the transport path.

Figure 2:
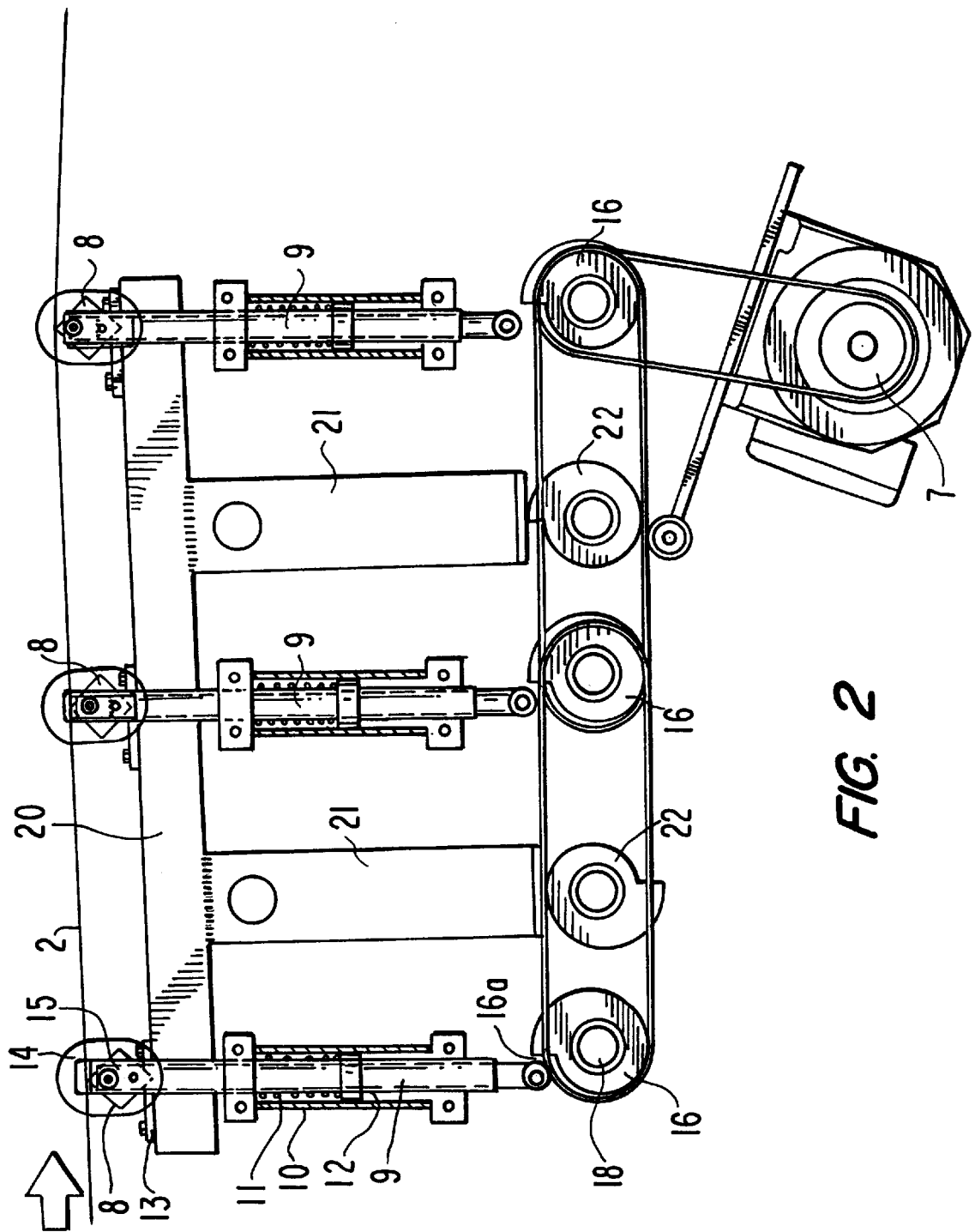
FIG. 2 is a side view of the shaking device of FIG. 1 on an enlarged scale.
Figure 3:
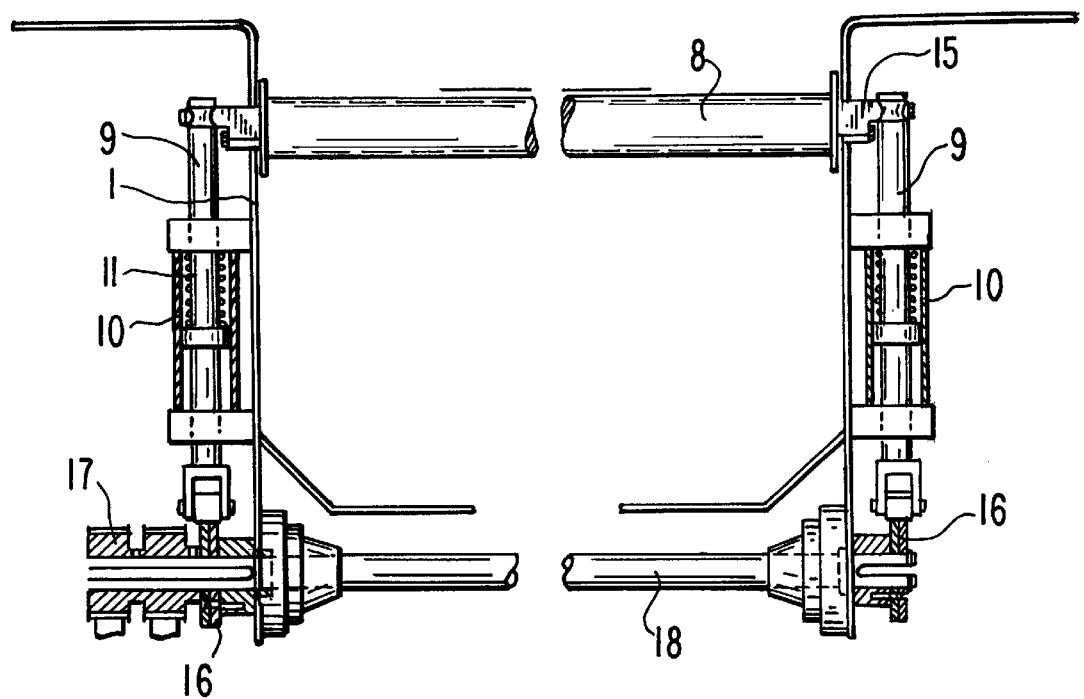
FIG. 3 is a sectional view of the illustration of FIG. 2 in a plane in which a transverse stay and the components performing the shaking movement are arranged.

The shaking device 5 schematically represented in FIG. 1 is illustrated on a larger scale in FIG. 2. The shaking device 5 is comprised of transverse stays 8 which extend underneath the mesh belt 2 in a direction transverse to the transport direction. They have in this embodiment a square cross-section. As can be seen in FIG. 2, the tubes with square cross-section which form the transverse stays 8 are positioned on edge with respect to the cross-section so that a small contact surface relative to the mesh belt results. The ends of the transverse stays 8 have flow removal plates 14 which insure that, if needed, excess chocolate is returned into the chocolate circulation.

Below the lower return belt portion of the mesh belt 2 (see FIG. 1) eccentric discs 16 are located wherein two eccentric discs 16 are arranged respectively on a common shaft 18. One revolution of the eccentric discs 16 causes a reciprocating vertical stroke of the plunger arrangement 9, 10. These plunger arrangements 9, 10 are comprised of a plunger rod 9 and a guide 10 in the form of a tube which is fastened on the frame 1. A spring 11 is arranged in the tube serving as the guide 10. This spring 11 is supported between a portion of larger diameter 12 of the plunger rod 9 and an upper member which is connected to the guide 10.

In the represented embodiment three transverse stays 8 are provided. Of course, a larger number of transverse stays can be used. Each transverse stay 8 has two eccentric discs 16, each having a respective plunger arrangement 9, 10. The eccentric discs 16 are driven by the drive motor 7 via toothed belts and pulleys 17 provided at the ends of the drive shaft 18.

When viewing FIG. 2, it can be seen that the eccentric curve of the eccentric discs 16 has a sudden jump 16a from the point corresponding to the highest amplitude stroke and the point corresponding to the smallest amplitude stroke. One revolution of the eccentric disc 16 produces one shaking amplitude.

Figure 4:
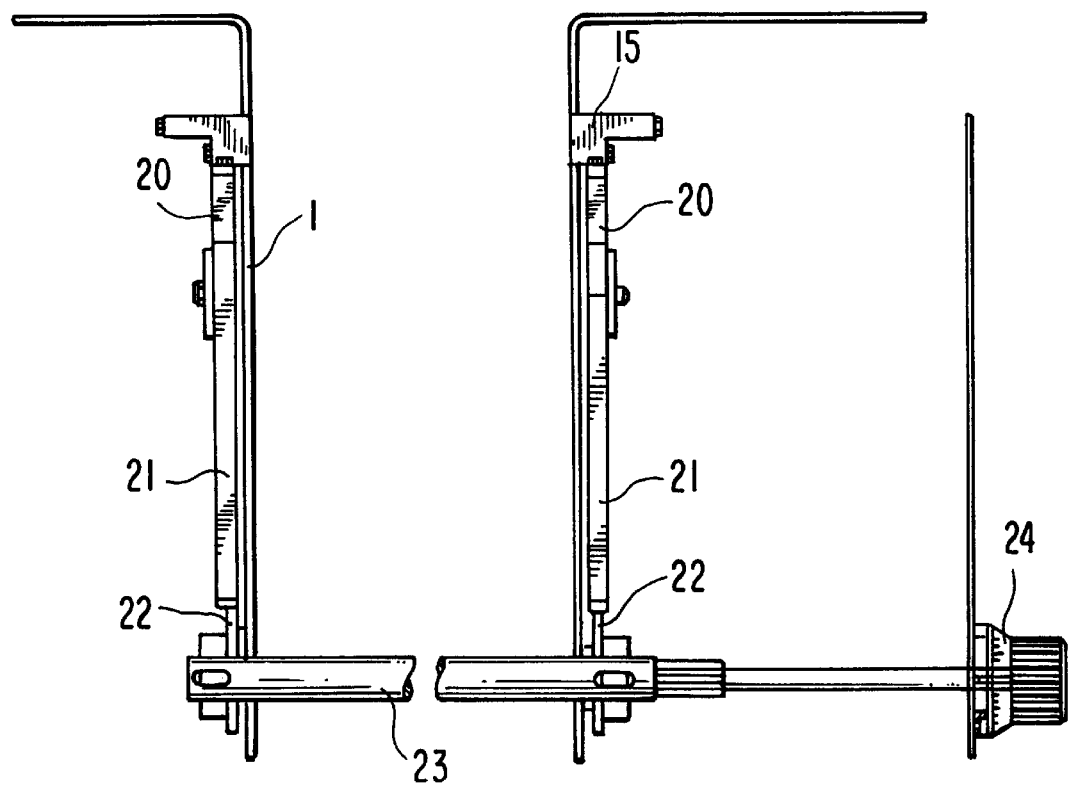
FIG. 4 is a sectional view of a plane in which the shaking amplitude adjustment device for the shaking device is arranged.

The amplitude or the stroke to be performed by one transverse stay 8 is adjustable by means of a shaking amplitude adjusting device having longitudinal adjusting beams 20. Two such longitudinal adjusting beams 20 are provided. These two longitudinal adjusting beams 20 are arranged on adjusting plungers 21 which can be adjusted, i.e., reciprocated, by means of eccentric adjusting discs 22. For this purpose, the discs 22 are connected to a common shaft 23 (see FIG. 4). The adjustment is carried out by means of a hand wheel 24 that can be rotated accordingly. The higher the adjusting plunger 21 is lifted, the smaller is the amplitude or the stroke of the plunger arrangement 9, 10, i.e., the corresponding roller at the end of the plunger rod 9 engages the corresponding eccentric disc 16 later.

Impact plates 13 are fastened on the adjusting beam 20 on which the bearing blocks at the ends of the transverse stays 8 will impact upon downward movement.

Each transverse stay 8 is independently supported and movable relative to the other transverse stays. For each transverse stay 8 two plunger arrangements 9, 10 and two eccentric discs 16 on a common shaft 18 are provided. The stroke or the amplitude for each transverse stay 8 can be individually adjusted, depending on how far the corresponding adjusting plunger 21 is lifted or lowered by means of the corresponding eccentric adjusting disc 22 rotated via the hand wheel 24. Because of the telescopic embodiment of the plunger arrangements 9, 10 the shaking action is enhanced because the spring 11 provides an additional impact upon downward movement.

While specific embodiments of the invention have been shown and described in detail to illustrate the inventive principles, it will be understood that the invention may be embodied otherwise without departing from such principles.

What is claimed is:

1. A device for coating food articles with a fat-containing substance, the device comprising:

a circulating endless mesh belt having an upper belt portion configured to transport the foodstuff articles in a transport direction and a lower return belt portion;

a shaking device positioned underneath the upper belt portion downstream in the transport direction of an area where the foodstuff articles are coated;

the shaking device having transverse stays positioned transversely to the transport direction, wherein the transverse stays are configured to be reciprocated vertically with a shaking amplitude against the upper belt portion;

wherein the transverse stays are supported individually and configured to be reciprocated individually in a reciprocating direction.

2. The device according to claim 1, wherein the shaking device comprises eccentric discs configured to individually reciprocate the transverse stays and perform for each revolution one shaking amplitude, wherein the eccentric discs have an eccentric curve with a highest amplitude point and a lowest amplitude point, wherein the eccentric curve has a jump between the highest and lowest amplitude points.

3. The device according to claim 2, wherein the eccentric discs correlated respectively with one of the transverse stays are arranged underneath the lower return belt portion and are connected by a common drive shaft, wherein the shaking device further comprises reciprocating plunger arrangements arranged between each one of the eccentric discs and the correlated transverse stays and configured to transmit an eccentric stroke of the eccentric discs onto the transverse stays.

4. The device according to claim 3, wherein each one of the reciprocating plunger arrangements is a telescoping device having a spring configured to be tensioned by an upward movement of the reciprocating plunger arrangement and released by a downward movement of the plunger arrangement to thereby enhance an impact of the transverse stay.

5. The device according to claim 4, wherein the shaking device further comprises a shaking amplitude adjustment device comprising adjusting beams positioned perpendicularly to the transverse stays and adjustable in the reciprocating direction of the transverse stays, wherein the transverse stays impact on the adjusting beams when performing a downward stroke.

6. The device according to claim 5, wherein the adjusting beams have impact plates on which the transverse stays impact.

7. The device according to claim 5, wherein the shaking amplitude adjustment device comprises eccentric adjusting discs and adjusting plungers positioned between the eccentric adjusting discs and the adjusting beams and configured to transmit an eccentric stroke of the eccentric adjusting discs onto the adjusting beams to thereby adjust the adjusting beams in the reciprocating direction of the transverse stays.

* * * * *